(12) United States Patent
Thebault et al.

(10) Patent No.: US 10,106,129 B2
(45) Date of Patent: Oct. 23, 2018

(54) WINDSCREEN WIPER

(71) Applicant: Valeo Systèmes d'Essuyage, Le Mesnil Saint Denis (FR)

(72) Inventors: Denis Thebault, Clermont Ferrand (FR); Xavier Bousset, Mezel (FR); Giuseppe Grasso, Le Breuil sur Couze (FR); Gérald Caillot, Cernay la Ville (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 137 days.

(21) Appl. No.: 14/309,544

(22) Filed: Jun. 19, 2014

(65) Prior Publication Data

US 2014/0373300 A1    Dec. 25, 2014

(30) Foreign Application Priority Data

Jun. 19, 2013   (FR) ...................... 13 55805

(51) Int. Cl.
*B60S 1/38*       (2006.01)

(52) U.S. Cl.
CPC ........... *B60S 1/3877* (2013.01); *B60S 1/3808* (2013.01); *B60S 1/3848* (2013.01); *B60S 1/3881* (2013.01); *B60S 1/381* (2013.01); *B60S 2001/382* (2013.01); *B60S 2001/3812* (2013.01)

(58) Field of Classification Search
CPC ...... B60S 1/3877; B60S 1/3881; B60S 1/381; B60S 1/3875; B60S 1/3848; B60S 1/3874; B60S 1/3882; B60S 1/38
USPC ........... 15/250.43, 250.361, 250.451, 250.44
See application file for complete search history.

(56) References Cited

U.S. PATENT DOCUMENTS

| 3,427,637 | A | * | 2/1969 | Quinlan | B60S 1/3801 15/250.451 |
| 3,772,814 | A | * | 11/1973 | Sylvester | A01K 81/00 43/6 |
| 2008/0295273 | A1 | * | 12/2008 | Lin | B60S 1/381 15/250.452 |
| 2011/0113580 | A1 | * | 5/2011 | Caillot | B60S 1/3862 15/250.01 |
| 2013/0269142 | A1 | * | 10/2013 | Egner-Walter | B60S 1/38 15/250.32 |

FOREIGN PATENT DOCUMENTS

| DE | 102010056462 A1 | * | 7/2012 | ........... B60S 1/3881 |
| EP | 2596999 A2 | * | 5/2013 | ........... B60S 1/3881 |
| FR | 2963595 A1 |   | 2/2012 |   |
| WO | WO 2007142390 A1 | * | 12/2007 | ............... B60S 1/38 |

OTHER PUBLICATIONS

EP2596999A2 (machine translation), 2013.*
Definition of harpoon in Oxford Dictionary, 2016.*

* cited by examiner

*Primary Examiner* — Andrew A Horton
(74) *Attorney, Agent, or Firm* — Osha Liang LLP

(57) ABSTRACT

The invention relates to a support mount (10) for a windscreen wiper, said mount (10) comprising a body of longitudinal principal orientation (X), said body comprising first means designed to receive a curving vertebra (20) and second means designed to hold a deflector (30) of said wiper, characterized in that said second means comprise notches (50) making it easier for said vertebra to curve.
The invention also relates to a windscreen wiper comprising such a mount (10).
The invention also relates to a wiping system comprising such a wiper.

8 Claims, 2 Drawing Sheets

WINDSCREEN WIPER

Figure 1:
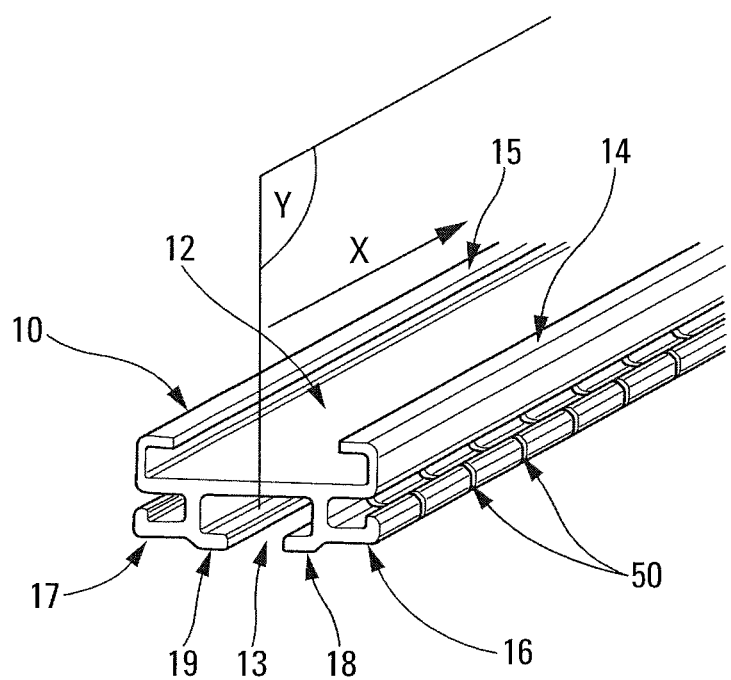

The field of the present invention is that of equipment for vehicles, and more particularly that of equipment for wiping the windows of motor vehicles.

Motor vehicles are commonly equipped with windscreen wiper systems for washing the windscreen and avoiding disruption to the driver's view of his surroundings. These windscreen wipers are conventionally driven by arms or a wiper holder carrying out an angular to-and-fro movement and having elongate wipers which themselves bear squeegee blades made of a resilient material. These blades rub against the windscreen and evacuate the water by removing it from the driver's field of view. The wipers are produced in the form either, in a conventional version, of articulated yokes which hold the squeegee blade at a number of discrete locations or, in a more recent version, known as the "flat blade" version, of a semi-rigid assembly which holds the squeegee blade along its entire length.

Patent application FR2963595A1 discloses a windscreen wiper comprising a support mount of longitudinal principal orientation and a wiping blade which is borne by said mount. The mount comprises an upper tubular body containing a curving vertebra and a lower, open housing containing an upper mounting heel of the wiping blade. An aerodynamic deflector is attached to said support mount by clipping into grooves provided laterally on the support mount.

The upper tubular body, or upper housing, may be of closed configuration, as in the patent application FR2963595A1. It is also known for this housing to be substantially open in said longitudinal direction. It is thus possible to increase the flexibility of the support mount. However, in cases of extreme climatic conditions, for example when it is very cold, the opening created on the upper housing of the support mount is not sufficient to provide said support mount with the required flexibility.

The invention has the object of proposing a support mount for a windscreen wiper having increased flexibility, whatever the climatic environment of the windscreen wiper.

To that end, the invention relates to a support mount for a windscreen wiper, said mount comprising a body having a longitudinal extension direction, termed longitudinal principal orientation, said body comprising first means designed to receive a curving vertebra and second means designed to hold a deflector of said wiper.

According to the invention, said second means comprise notches making it easier for said vertebra to curve.

Thus, the support mount has increased flexibility in the longitudinal direction and in torsion in comparison with mounts without notches at said second means, whether the upper housing of said mount is closed or open.

In addition, assembling the support mount with the aerodynamic deflector is made easier. Indeed, this assembly is first performed by clipping counter-forms of the deflector into grooves, or flanges, provided laterally on the support mount, then by sliding with respect to each other.

The notches created on the means of the mount designed to hold the deflector make it possible to reduce the friction between these two elements, in particular when assembling them.

According to various embodiments of the invention, which may be considered together or separately:

each of said notches is produced in a direction substantially transverse, in particular perpendicular, to said longitudinal extension direction, said second means are lateral flanges each comprising a securing lip designed to engage with a complementary lip arranged on a branch of said deflector, said first means comprise a first housing, termed the upper housing, for said vertebra, said upper housing is open, at least in part, at its centre, along the longitudinal extension direction, said upper housing has a continuous open upper part over the entire length of said mount, preferably at the centre thereof, said upper housing comprises notches, termed complementary notches, each of said notches being created in a direction substantially transverse, in particular perpendicular, to said longitudinal extension direction, each of said complementary notches passes through the thickness of said upper housing, said complementary notches form incomplete cut-outs on sidewalls of said upper housing, said mount further comprises hooks, termed longitudinal hooks, which define a second housing, termed lower housing, said lower housing being open so as to receive an upper mounting heel of a wiping blade of the wiper, said lower housing and said upper housing are separated by a common wall, said body is symmetric with respect to a plane of symmetry belonging to said body, said plane of symmetry being oriented along said longitudinal extension direction, such that said notches are present on either side of said mount, said mount is made of plastic, said mount is made of polypropylene (PP), said second upper housing, or said vertebra, is able to receive a heating element, said heating element extends in said longitudinal extension direction, along the support mount.

The invention also relates to a windscreen wiper comprising a mount as described hereinabove, a curving vertebra and a wiping blade, and preferably also a deflector. In this case, it is preferably a wiper of the flat-blade type, i.e. without a yoke.

The invention also relates to a wiping system comprising such a wiper.

Figure 2:
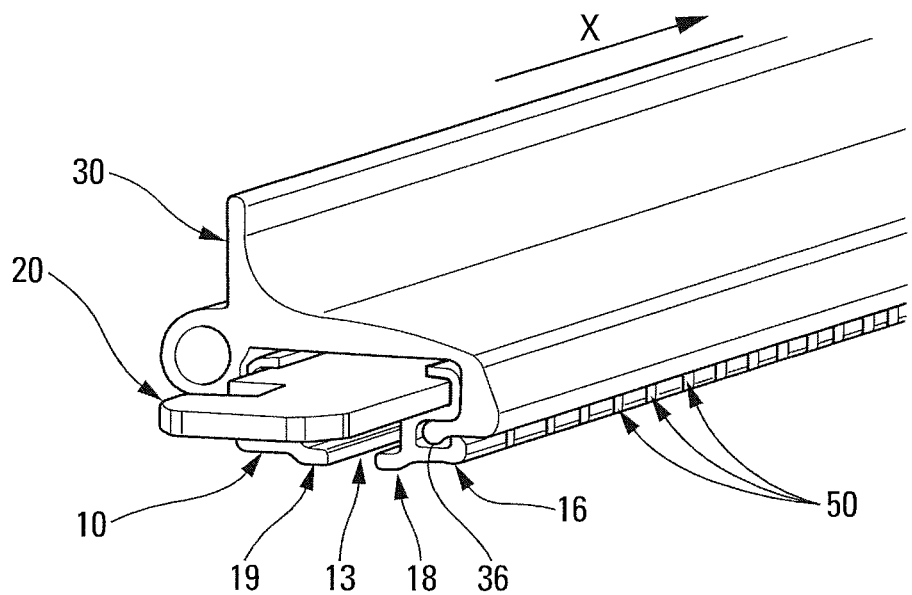
Figure 3:
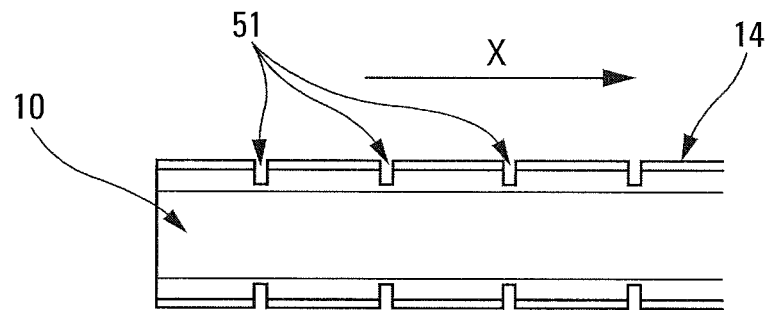
Figure 4:
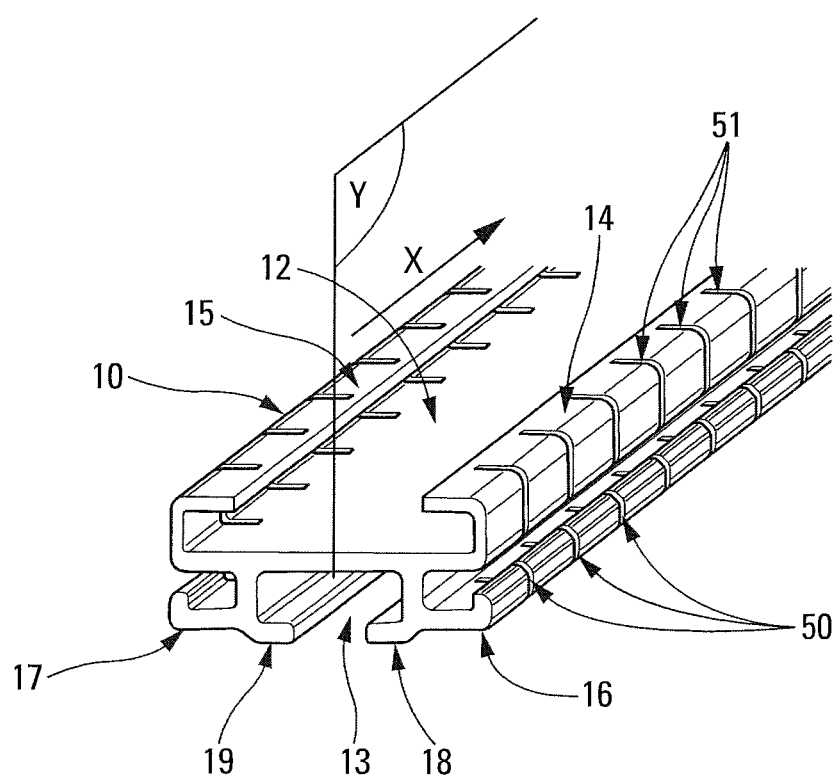

The invention will be better understood, and further aims, details, features and advantages thereof will become more clearly apparent from the following detailed explanatory description of at least one embodiment of the invention, given purely by way of illustrative and non-limiting example, with reference to the appended schematic drawings, in which:

FIG. 1 is a perspective view of a first exemplary embodiment of a mount according to the invention, FIG. 2 repeats FIG. 1 and makes it possible, furthermore, to visualize a deflector and a vertebra, FIG. 3 is a side view of a second exemplary embodiment of a mount according to the invention, FIG. 4 is a perspective view of the mount of FIG. 3.

As shown in the various figures, the invention relates to a support mount 10 for a windscreen wiper. The mount 10 of the invention comprises a body having a longitudinal principal orientation. Said longitudinal orientation is also that of the windscreen wiper; it is indicated by the direction X in FIGS. 1 to 4. The body of the mount 10 comprises first means designed to receive a curving vertebra 20. The curving vertebra 20 provides the stiffness necessary to press the windscreen wiper against a vehicle windscreen and holds the wiping blade 40 over its entire length. The body of the mount also comprises second means designed to hold a deflector 30 of said wiper. The deflector 30 provides the wiper with the required aerodynamic properties.

The first means designed to receive the curving vertebra 20 may be created in various ways. This may be a closed upper housing, designed to contain the curving vertebra. As shown, the upper housing 12 may also be open, at its centre, in the longitudinal extension direction X. Said upper housing 12 preferably has a continuous open upper part over the entire length of said mount 10. Said upper housing 12 then has sidewalls 14, 15 in the form of retaining hooks for the vertebra 20. Advantageously, these hooks have a substantially L-shaped cross section, turned through 180° respectively clockwise and anticlockwise, and face each other symmetrically with respect to a plane of symmetry Y of said body. The width of said open upper part is thus smaller than the width of the upper housing 12, when these widths are measured in parallel planes.

The second means, for their part, are designed to retain the deflector 30 of said wiper. These second means are lateral flanges 16, 17 each comprising a securing lip designed to engage with a complementary lip arranged on a branch 36 of said deflector 30. Said lateral flanges 16, 17 extend in this case parallel to a lower edge of the retaining hooks of the vertebra 20.

Although the support mount 10 is provided in order to provide stiffness to the wiper, it is also of interest that said mount 10 be flexible. Indeed, the mount is also provided so as to adapt the wiper pressure to the windscreen to be wiped. Indeed, the flexibility of the support mounts 10 of the prior art is not satisfactory. That is why, according to the invention, said second means further comprise notches making it easier for said mount 10 to curve.

Said notches 50 can be seen, in a first exemplary embodiment of the invention, in FIGS. 1 and 2. Said notches 50 are created in a direction which is substantially transverse to said longitudinal extension direction X. They are preferably regularly spaced apart from one another.

The flexibility of the mount according to the invention is thus increased, on one hand by virtue of the opening of the first housing, termed upper housing 12, and on the other hand by virtue of the notches 50 created at regular intervals along the lateral flanges 16, 17. This results in a mount 10 which is flexible in the longitudinal direction X but also flexible in torsion.

As shown in FIGS. 3 and 4, in a second exemplary embodiment of the invention, the notches 50 may be complemented by notches 51 created on the sidewalls 14, 15 of the upper housing 12, in particular when the latter is open. These notches 51 will henceforth be termed complementary notches.

As with the notches 50 provided on the lateral flanges 16, 17, said complementary notches 51 will be created in a direction which is substantially transverse with respect to said longitudinal extension direction X. They will moreover cut through the thickness of said upper housing 12. They may in particular form incomplete cut-outs on the sidewalls 14, 15 of the upper housing 12. In other words, the cut-outs 51 leave matter at their ends, along free edges of said hooks for retaining the vertebra.

It is to be noted that the complementary notches 51 may also be created on the sidewalls of the upper housing 12, even if the latter is closed (exemplary embodiment not shown).

Said complementary notches 51 are preferably regularly spaced apart from one another, for example according to the same spacing as the notches 50 provided on the lateral flanges 16, 17. The complementary notches 51 may also be located in one and the same plane as the notches 50 provided on the lateral flanges 16, 17, at least for some of these.

As shown in the figures, the mount 10 of the invention further comprises hooks 18, 19, termed longitudinal hooks, the extension direction of which is substantially parallel to said longitudinal extension direction. They extend here from a wall which is shared by the upper 12 and lower 13 housings, from which wall said hooks for holding the vertebra 20 also originate. Advantageously, these longitudinal hooks 18, 19 are of substantially L-shaped cross section and face each other symmetrically with respect to a plane of symmetry Y of said mount 10. Said lower housing 13 then has a continuous open lower part over the entire length of said mount 10. The width of this open lower part is smaller than the width of the lower housing 13, when these widths are measured in parallel planes. The lower housing 13 is open in order to accommodate an upper mounting heel of a wiping blade of the wiper, which is not shown but will be well known to one skilled in the art.

It can also be seen, in all the figures, that said lower housing 13 is located opposite the upper housing 12, with respect to the lateral flanges 16, 17. In other words, the upper housing 12 and the lower housing 13 are separated by a shared wall. The lateral flanges 16, 17 extend in this case from a lateral edge of said longitudinal hooks 18, 19 which define the lower housing 13 and which themselves originate from a base of the upper housing 12. Said base is prolonged on either side by said hooks for retaining the vertebra.

A plane of symmetry Y is represented in the figures. In a virtual sense, this plane of symmetry Y is that with respect to which the body of said mount 10 is obtained. It is thus understood that the notches 50 provided on the lateral flanges 16, 17 and the complementary notches 51, if present, are located facing one another on either side of said plane of symmetry.

It will be preferable to make the support mount 10 from plastic, although any other material would be possible, for example a metallic material. In the present case, the notches 50, 51 may easily be provided during manufacture of said mount 10 from a plastic of the polypropylene (PP) type.

It is to be noted that variant embodiments are of course possible. It is in particular also possible, in an additional embodiment, that the upper housing 12, in particular said vertebra 20, be able to receive a heating element (embodiment not shown). In this embodiment, said heating element would be such that it would extend in the longitudinal extension direction X, along the support mount 10.

Whatever the embodiment, the invention which has just been described will preferably be applied to the windscreen wipers of the wiping systems for a motor vehicle.

The invention claimed is:

1. A support mount for a windscreen wiper, said mount comprising:
    a body elongated in a longitudinal direction, said body comprising first means for receiving a single curving vertebra and second means for holding a deflector of said wiper,
    wherein said second means comprise notches that facilitate the curving of the vertebra,
    wherein said second means are lateral flanges each comprising a securing lip that engages with a complementary lip arranged on a branch of said deflector,
    wherein the securing lip comprises a first portion, which is perpendicular to a second portion of the securing lip,
    wherein said first means comprise an upper housing, for said vertebra, said upper housing comprising sidewalls in the form of retaining hooks for the vertebra and complementary notches, each of said complementary notches being created in a lateral direction, wherein each sidewall comprises an upper wall and a lower wall, the upper wall being directly connected to the lower wall, the sidewalls being directly connected to each other by a base wall, the upper wall defining a free end of the sidewall, the upper wall being substantially perpendicular to the lower wall and substantially parallel to the base wall, and the upper walls being spaced apart from each other by an open space in the lateral direction, which is perpendicular to the longitudinal direction, the mount further comprising longitudinal hooks, which define a lower housing, the lower housing being open so as to receive an upper mounting heel of a wiper blade of the wiper, each longitudinal hook comprising an upper wall and a lower wall, the upper wall of the longitudinal hook being directly connected to the lower wall of the longitudinal hook, the lower wall of the longitudinal hook being substantially perpendicular to the upper wall of the longitudinal hook and substantially parallel to the base wall, the lower walls of the longitudinal hooks being spaced apart from each other by an open space in the lateral direction, wherein the base wall of the upper housing and an upper wall of the lower housing form a common wall, and wherein said complementary notches form cut-outs on the upper, lower, and base walls of the sidewalls of said upper housing, said cut-outs leaving matter at ends of the upper walls by incompletely cutting through the upper walls, said cut-outs leaving matter along free edges of said hooks for retaining the vertebra, and said cut-outs leaving matter on the common wall by incompletely cutting through the common wall.

2. The mount according to claim 1, in which each of said notches is produced in the lateral direction.

3. The mount according to claim 1, wherein said second means extend substantially along said longitudinal direction of the body.

4. The mount according to claim 1, wherein said upper housing is open, at least in part, at its center, along said longitudinal direction.

5. The mount according to claim 1, wherein said upper housing has a continuous open upper part over the entire length of said mount.

6. The mount according to claim 1, in which said body is symmetric with respect to a plane of symmetry belonging to said body, said plane of symmetry being oriented along said longitudinal direction.

7. A windscreen wiper comprising:
   the support mount as defined in claim 1;
   the single curving vertebra;
   the wiper blade; and
   the deflector.

8. A wiping system comprising the windscreen wiper as claimed in claim 7.

* * * * *